P. Perry,
Bread Machine,
No. 56,091. Patented July 3, 1866.

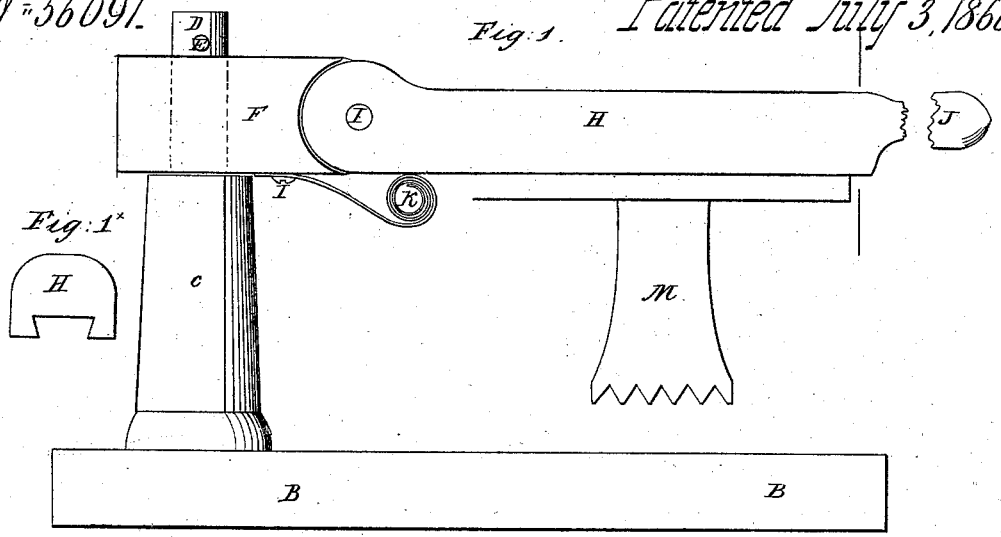
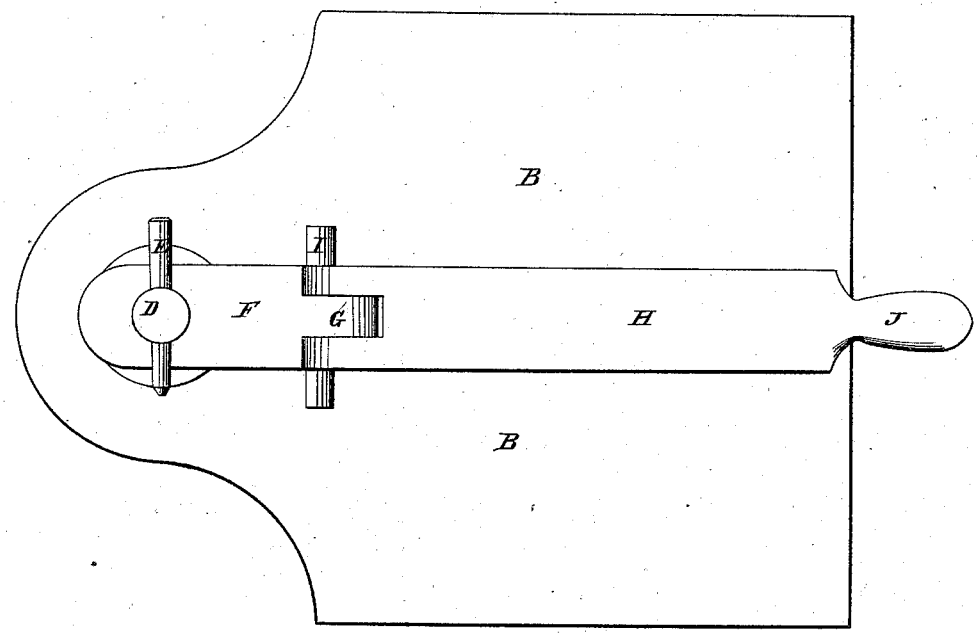

Witnesses:
L. P. Jenks
G. J. Phelan

Inventor;
Philander Perry

UNITED STATES PATENT OFFICE.

PHILANDER PERRY, OF CHARLESTOWN, MASSACHUSETTS.

IMPROVED DOUGH-KNEADER, MEAT-POUNDER, &c.

Specification forming part of Letters Patent No. 56,091, dated July 3, 1866.

*To all whom it may concern:*

Be it known that I, PHILANDER PERRY, of Charlestown, Middlesex county, State of Massachusetts, have invented a new and Improved Machine for the Purpose of Kneading Dough and Performing other Processes, herein mentioned; and I do hereby declare that the following is a full and exact description of the same, taken in connection with the accompanying drawings, with letters of reference marked thereon, which together form my specification.

The nature of my machine is an arrangement of a platform with, at one end, a standing pillar, from which proceeds a lever supported by a block. The under side of this lever is slotted or dovetailed, by which means there is held underneath, first, a tool for pounding meat to make it more tender; second, a tool for mashing potatoes; third, a tool for chopping up meat, &c.; fourth, a tool for rolling crust or pastry; fifth, a tool for kneading dough.

Figure 3:
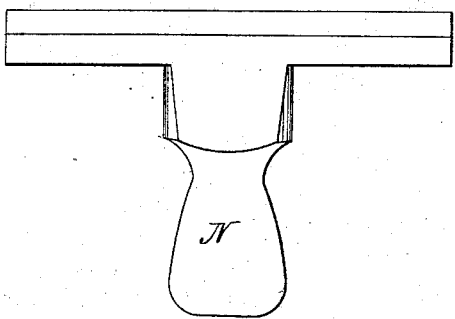
Figure 4:
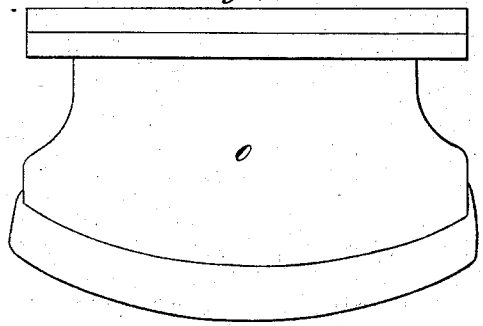
Figure 5:
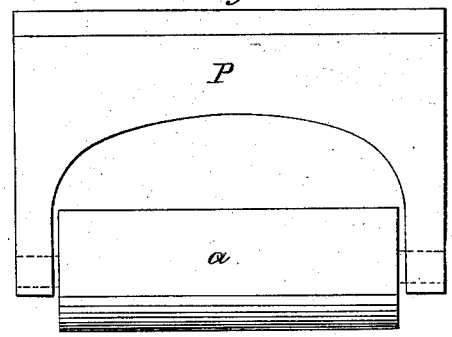
Figure 6:
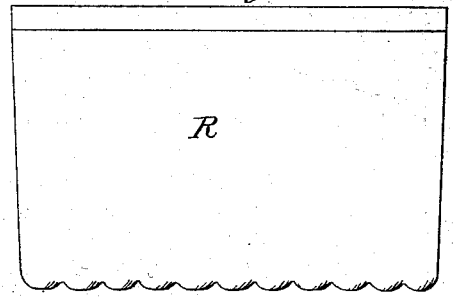
Figure 7:
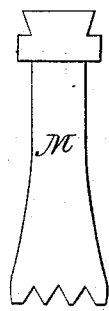
Figure 8:
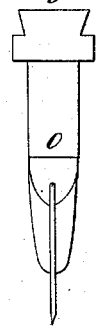
Figure 9:
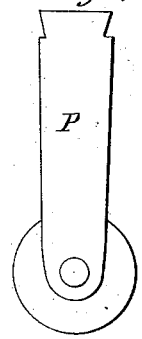
Figure 10:

In the drawings annexed, Figure 1, Plate I, is a side view of the machine, with a view of the beef-tendering tool. Fig. 2, Plate I, is a view of the machine from the top. Fig. $1^\times$, Plate I, is a section of part of Fig. 1 (the lever) at the line A A. Fig. 3, Plate II, is a side view of the machine for mashing potatoes. Fig. 4, Plate II, is a side view of the tool for chopping meat. Fig. 5, Plate II, is a side view of the tool for rolling pastry. Fig. 6, Plate II, is a side view of the tool for kneading dough. Fig. 7, Plate II, is an end view of the beef-tendering tool. Fig. 8, Plate II, is an end view of Fig. 4. Fig. 9, Plate II, is an end view of Fig. 5. Fig. 10 is an end view of Fig. 6.

In the drawings annexed, B B, Figs. 1 and 2, is a platform. C, Fig. 1, is an upright round pillar having a shaft, D, Figs. 1 and 2, proceeding upward from its top, which shaft D has passing through it a peg or pin, E, Figs. 1 and 2.

F, Figs. 1 and 2, is a block shaped as seen in the drawings, and with a hole or bearing at one end, by means of which it is borne by the shaft D.

The block F has at G, Fig. 2, a tongue of a hinge, and at this point there is hinged to it a lever, H, Figs. 1 and 2, the same being held by the pin I. This lever bears at the other end a handle, J, and has on its under side a slot or groove dovetailed in shape. (Seen in section in Fig. $1^\times$, Plate I.)

A spring, K, Fig. 1, is secured to the under side of the block F by means of a screw, L.

Suspended to the under side of the lever H by means of the dovetailed groove and its corresponding tenon is the tool M, called the "beef-tenderer." (Seen in end view in Fig. 7, Plate II.) This tool is armed with teeth (sometimes made of iron galvanized or tinned) at the lower end, and is pressed down upon the meat placed on the platform beneath it by means of the lever H.

N, Fig. 3, is the tool for mashing potatoes, and is formed like the pestle of a mortar, having also a bar attached to it with a tenon fitting into the dovetailed groove.

O, Figs. 4 and 8, is the tool for chopping up meat, &c., and is composed of a metallic blade in the form of the segment of a circle, held in the usual mode with a hand meat-chopper by a slab of wood rounded at the lower edge and furnished at top with a tenon to fit into the dovetailed groove of the lever H.

P, Fig. 5, is a slab of wood furnished with a dovetailed tenon at top, and having two projections at the lower part, which projections hold a roller, Q. This tool is seen in end view at Fig. 9, and is used for rolling pastry.

R, Fig. 6, (seen in end view at Fig. 10,) is a slab of wood armed with the dovetailed tenon at top, and with its lower edge cut in scallops, as seen in Fig. 6, so as to present a series of knobs or bosses. This is the tool for kneading dough.

I sometimes have two or more dovetailed slots in the under side of the lever H, and sometimes I use two or more of the above-described tools at a time.

What I claim herein as of my own invention, and desire to secure by Letters Patent, is—

1. The spring K, in combination with the jointed lever, pillar, and platform, when constructed and used substantially as described.

2. The dovetailed groove, for the purpose of holding the tools, in connection with the movable lever and platform, all constructed and used substantially as described.

3. The whole machine, being the combination of the above tools—viz., the beef-tenderer, potato-masher, meat-chopper, pastry-roller, and dough-kneader—or either of them, with the double-jointed lever, pillar, and platform, when constructed and used substantially as described.

PHILANDER PERRY.

Witnesses:
LEMUEL P. JENKS,
O. J. PHELAN.